US011287940B2

(12) United States Patent
Iwamura

(10) Patent No.: US 11,287,940 B2
(45) Date of Patent: Mar. 29, 2022

(54) HMI DEVELOPMENT SUPPORT DEVICE, HMI DEVELOPMENT SUPPORT METHOD, AND NON-TRANSITORY COMPUTER-READABLE RECORDING MEDIUM

(71) Applicant: OMRON Corporation, Kyoto (JP)

(72) Inventor: Shintaro Iwamura, Otsu (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 16/603,239

(22) PCT Filed: Feb. 28, 2018

(86) PCT No.: PCT/JP2018/007412
§ 371 (c)(1),
(2) Date: Oct. 7, 2019

(87) PCT Pub. No.: WO2018/220922
PCT Pub. Date: Dec. 6, 2018

(65) Prior Publication Data
US 2021/0081078 A1    Mar. 18, 2021

(30) Foreign Application Priority Data

May 30, 2017    (JP) .............................. JP2017-106175

(51) Int. Cl.
*G06F 3/048*        (2013.01)
*G06F 3/0481*       (2022.01)
(Continued)

(52) U.S. Cl.
CPC ......... *G06F 3/0481* (2013.01); *G05B 19/418* (2013.01); *G05B 19/4183* (2013.01); *G06F 3/0484* (2013.01)

(58) Field of Classification Search
CPC .... G06F 40/194; G06F 40/106; G06F 40/197; G06F 8/30; G06F 3/0481; G06F 3/0484;
(Continued)

(56) References Cited

U.S. PATENT DOCUMENTS 5,974,254 A    10/1999 Hsu
7,071,934 B1 *  7/2006 Faoro .................... G06F 40/194
                                                715/229

(Continued)

FOREIGN PATENT DOCUMENTS

CN    102591635    7/2012
CN    104142881    11/2014
(Continued)

OTHER PUBLICATIONS

"Notification of Written Submission of Publications of Japan Counterpart Application", dated Nov. 10, 2020, with English translation thereof, p. 1-p. 13.

(Continued)

*Primary Examiner* — Linh K Pham
(74) *Attorney, Agent, or Firm* — JCIPRNET

(57) ABSTRACT

A plurality of HMI projects is easily compared. A HMI development support device includes a calculation unit (11) and a display unit (14). A HMI editing program (210) is stored in a storage unit (12), and by executing this program, the calculation unit (11) functions as a HMI editing unit. The HMI editing unit performs editing of a HMI project. The display unit (14) displays an editing screen of the HMI project. The HMI editing unit has a comparison processing unit which forms a comparison screen for comparing a reference HMI project and the HMI project being edited, and displays the comparison screen on the display unit (14). On the comparison screen, the comparison processing unit
(Continued)

highlights differences between the reference HMI project and the HMI project being edited.

4 Claims, 7 Drawing Sheets

(51) Int. Cl.
  *G06F 3/0484* (2022.01)
  *G05B 19/418* (2006.01)
(58) Field of Classification Search
  CPC .......... G06K 9/00483; G06K 9/00463; G06Q 30/02; G06Q 10/06; G09G 2320/08; G09G 2340/145; G09G 2370/027; Y02P 90/80; G05B 19/418; G05B 19/4183
  See application file for complete search history.

(56) References Cited

U.S. PATENT DOCUMENTS

| | | | |
|---|---|---|---|
| 2001/0013877 A1* | 8/2001 | Fujino | G06F 3/0481 715/835 |
| 2007/0153708 A1* | 7/2007 | Dominick | H04L 41/12 370/254 |
| 2008/0104016 A1* | 5/2008 | Atmaja | G06F 40/18 |
| 2008/0303819 A1 | 12/2008 | Latour et al. | |
| 2012/0304148 A1* | 11/2012 | Braun | G06F 8/34 717/104 |
| 2013/0262373 A1* | 10/2013 | Rampson | G06F 40/197 707/608 |
| 2013/0262420 A1* | 10/2013 | Edelstein | G06F 40/197 707/695 |
| 2014/0278307 A1 | 9/2014 | Hosey et al. | |
| 2015/0095755 A1* | 4/2015 | Bonk | G06F 40/197 715/229 |
| 2015/0199113 A1* | 7/2015 | Prabhat | G06F 3/0484 715/798 |
| 2016/0061579 A1* | 3/2016 | Tsujimoto | G01B 21/047 702/155 |
| 2018/0364897 A1* | 12/2018 | Takashima | G06F 9/44505 |

FOREIGN PATENT DOCUMENTS

| | | |
|---|---|---|
| JP | H0434662 | 2/1992 |
| JP | H04370805 | 12/1992 |
| JP | H11154108 | 6/1999 |
| JP | 2009157580 | 7/2009 |
| JP | 2012064156 | 3/2012 |
| JP | 2015079493 | 4/2015 |
| JP | 2016014951 | 1/2016 |
| JP | 2016024528 | 2/2016 |
| JP | 2016218977 | 12/2016 |
| WO | 2011154989 | 12/2011 |
| WO | 2012176365 | 12/2012 |
| WO | 2016139805 | 9/2016 |
| WO | 2016157540 | 10/2016 |

OTHER PUBLICATIONS

"Office Action of Japan Counterpart Application", dated Nov. 10, 2020, with English translation thereof, p. 1-p. 13.

"International Search Report (Form PCT/ISA/210) of PCT/JP2018/007412," dated Apr. 24, 2018, with English translation thereof, pp. 1-5.

"Office Action of Japan Counterpart Application", dated Sep. 15, 2020, with English translation thereof, p. 1-p. 06.

"Search Report of Europe Counterpart Application", dated Jan. 26, 2021, p. 1-p. 8.

"Office Action of China Counterpart Application" with English translation thereof, dated Dec. 28, 2021, p. 1-p. 17.

* cited by examiner

HMI DEVELOPMENT SUPPORT DEVICE, HMI DEVELOPMENT SUPPORT METHOD, AND NON-TRANSITORY COMPUTER-READABLE RECORDING MEDIUM

CROSS-REFERENCE TO RELATED APPLICATION

This application is a 371 application of the International PCT application serial no. PCT/JP2018/007412, filed on Feb. 28, 2018, which claims the priority benefits of Japan application no. 2017-106175, filed on May 30, 2017. The entirety of each of the above-mentioned patent applications is hereby incorporated by reference herein and made a part of this specification.

BACKGROUND OF THE INVENTION

Technical Field

The present invention relates to a HMI (human machine interface) development support technology for supporting HMI development of control equipment.

Related Art

Currently, industrial control equipment such as a PLC (programmable logic controller) or the like is equipped with an indicator capable of operation input, that is, a HMI. An operator can know states of the control equipment and a FA (factory automation) system including the control equipment by viewing a screen of the HMI. In addition, the operator can perform various settings such as a parameter setting and the like on each equipment of the FA system including the control equipment by performing an operation input on the screen of the HMI.

Then, in order to create the screen and function of the HMI, for example, a HMI development support device as shown in patent literature 1 is variously designed.

LITERATURE OF RELATED ART

Patent Literature

Patent literature 1: Japanese Laid-Open No. 2009-157580

SUMMARY

Problems to be Solved

However, in a conventional HMI development support device, basically, only one HMI project is displayed and edited, and comparison with other HMI projects is not easy. In addition, in the conventional HMI development support device, the HMI projects can only be displayed on the screen respectively even in a multi-window configuration, and detailed comparison in items of the HMI projects is not easy.

Accordingly, an objective of the present invention is to provide a HMI development support technology with which it is possible to easily compare a plurality of HMI projects.

Means to Solve Problems

The HMI development support device of the present invention includes a HMI editing unit and a display unit. The HMI editing unit performs editing of a HMI project which is configured by a plurality of objects. The HMI editing unit has a comparison processing unit which forms a comparison screen for highlighting differences between a reference HMI project and the HMI project being edited and displays the comparison screen on the display unit. In addition, in the HMI development support device, the comparison screen is a screen that highlights different attribute values in objects of the reference HMI project and objects of the HMI project being edited.

In the configuration, the differences between the reference HMI project and the HMI project being edited are easily recognized visually for each attribute value.

In addition, in the HMI development support device, the comparison processing unit forms the comparison screen for highlighting objects of the reference HMI project and objects of the HMI project being edited in which attribute values are different from each other and variables are common.

In the configuration, the differences are easily recognized visually for each displayed object.

In addition, in the HMI development support device, the comparison processing unit has a merge processing unit which reflects the attribute values of the objects of the reference HMI project on the attribute values of the objects of the HMI project being edited.

In the configuration, the attribute values of the objects of the reference HMI project is easily reflected on the objects of the HMI project being edited.

In addition, in the HMI development support device, the merge processing unit reflects selected attribute values when a plurality of attribute values is different.

In the configuration, merge can be selectively made for each attribute value.

In addition, the HMI development support device includes a temporary storage unit which temporarily stores the HMI project being edited. On receiving cancel of processing for reflecting the attribute values, the merge processing unit returns to the HMI project being edited that is read out from the temporary storage unit.

In the configuration, the attribute values of the objects before the merge are securely restored even if the merge is cancelled.

Effect

According to the present invention, a plurality of HMI projects can be easily compared.

DESCRIPTION OF THE EMBODIMENTS

Figure 1:
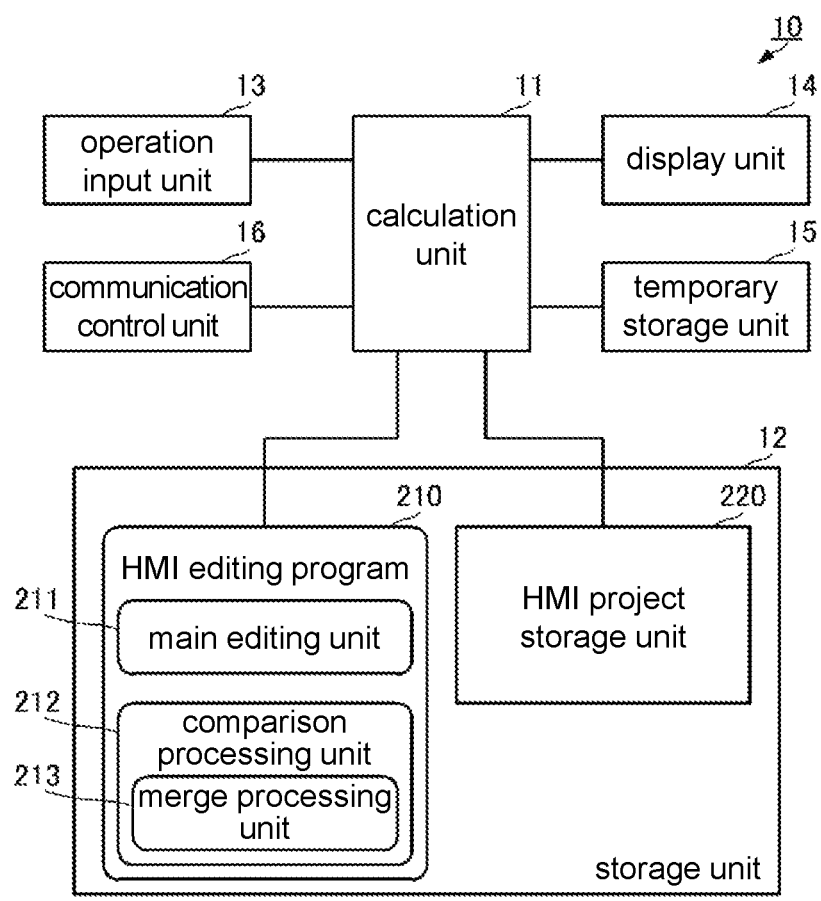
FIG. 1 is a functional block diagram of a HMI development support device of an embodiment of the present invention.

A HMI development support technology of an embodiment of the present invention is described with reference to the drawings. FIG. 1 is a functional block diagram of the HMI development support device of the embodiment of the present invention.

As shown in FIG. 1, a HMI development support device 10 includes a calculation unit 11, a storage unit 12, an operation input unit 13, a display unit 14, a temporary storage unit 15, and a communication control unit 16. Specifically, the HMI development support device 10 is implemented by a personal computer and the like.

The calculation unit 11 is a so-called CPU or the like and executes programs that are read out. A HMI editing program 210 is stored in the storage unit 12. The calculation unit 11 reads out and executes the HMI editing program 210, and thereby implements editing of a HMI project.

The HMI editing program 210 has a main editing unit 211 and a comparison processing unit 212. The main editing unit 211 is a part executing main processing of the editing of the HMI project.

The comparison processing unit 212 is a part executing comparison processing of the HMI project. The comparison processing refers to the processing for comparing the HMI project being edited and a reference HMI project. The comparison processing unit 212 has a merge processing unit 213.

The merge processing unit 213 is a part executing merge processing of the HMI project. The merge processing refers to the processing for reflecting attribute values and the like of the reference HMI project on the HMI project being edited. Besides, specific contents of the comparison processing and the merge processing are described later.

Besides, the comparison processing unit 212 may be executed by a call from the main editing unit 211. In addition, the comparison processing unit 212 may be described as a part of the main editing unit 211. Similarly, the merge processing unit 213 may be described as a part of the comparison processing unit 212. In addition, the merge processing unit 213 may be executed by a call from the comparison processing unit 212.

A HMI project storage unit 220 is assigned to the storage unit 12. A HMI project edited in the past is stored with a history thereof in the HMI project storage unit 220.

The operation input unit 13 is, for example, a mouse or a keyboard, and receives operation input to a HMI editing screen and outputs the operation input to the calculation unit 11.

The display unit 14 is, for example, a liquid crystal display or the like, and displays a HMI editing screen that corresponds to the processing of the HMI editing program 210 executed by the calculation unit 11.

The temporary storage unit 15 is a volatile memory or the like and temporarily stores the HMI project being edited. Besides, the temporary storage unit 15 may also temporarily store a reference object.

The communication control unit 16 executes communication between the calculation unit 11 and an external device. For example, the communication control unit 16 executes communication between the calculation unit 11 and an external control equipment or server.

Besides, the above-described HMI project storage unit 220 can also be omitted when the latest version of the HMI project installed on the control equipment is set as a reference online.

In addition, the above-described communication control unit 16 can also be omitted when the comparison processing is performed offline.

Figure 2:
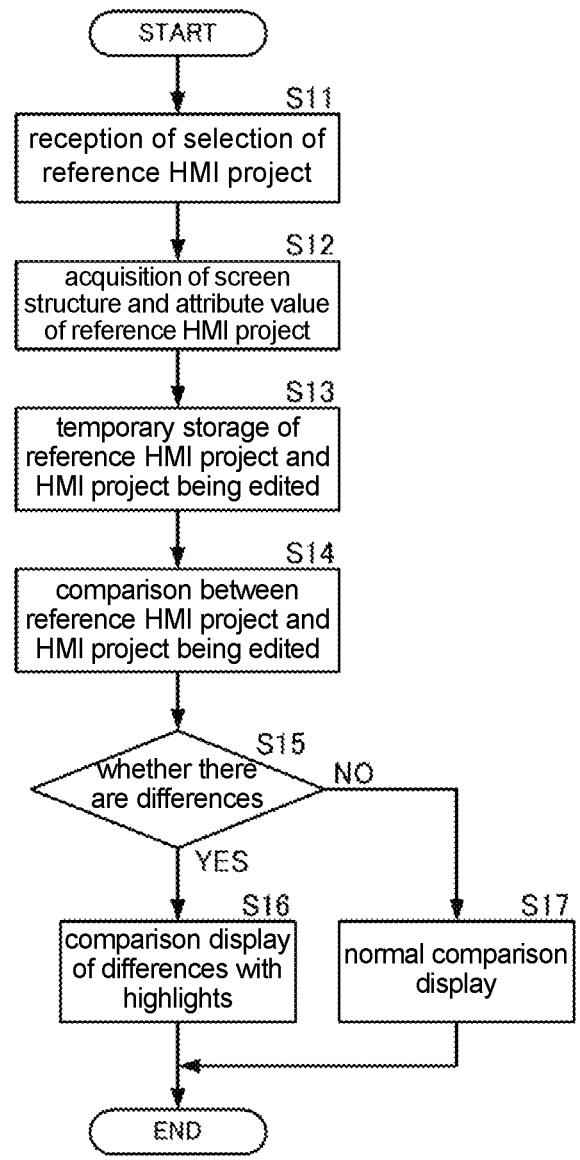
FIG. 2 is a flowchart of comparison processing in a HMI development support method of the present invention.

The HMI development support device 10 having this configuration executes the comparison processing and the merge processing of the HMI project as shown below. FIG. 2 is a flowchart of the comparison processing in the HMI development support method of the present invention.

Figure 3:
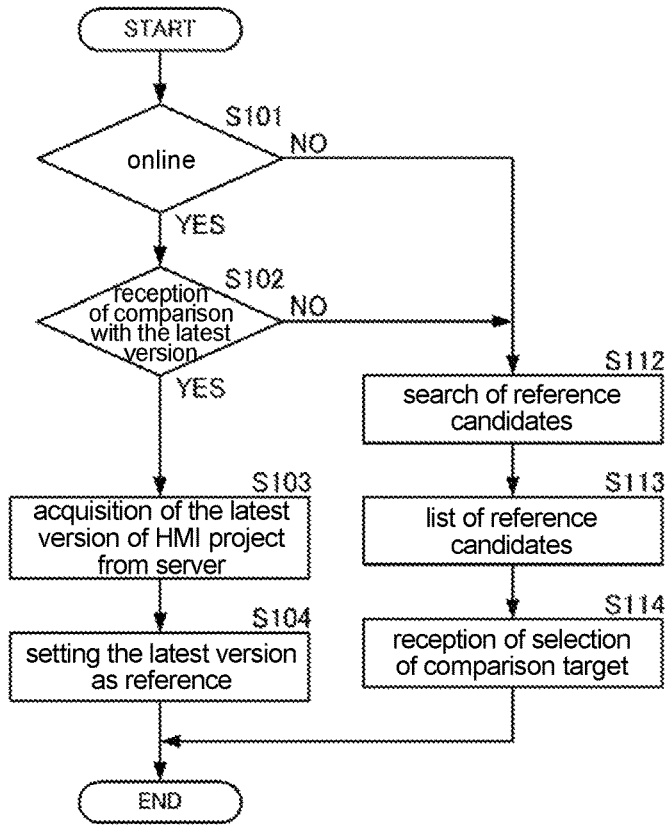
FIG. 3 is a flowchart of selection processing of a reference HMI project.

The HMI development support device 10 receives selection of the reference HMI project (S11). FIG. 3 is a flowchart of selection processing of the reference HMI project. When the HMI development support device 10 is in an online state (S101: YES) and receives comparison with the latest version of HMI project (S102: YES), the latest version of HMI project is acquired from the server (S103). The HMI development support device 10 sets the latest version of HMI project as the reference HMI project (S104).

When the HMI development support device 10 is offline (S101: NO) or receives comparison of an offline inquiry even in the online state (S102: NO), search of a reference candidate HMI project is performed on the HMI project storage unit 220 (S112). At this time, the HMI development support device 10 refers to variables of the objects included in the HMI project being edited, and extracts the HMI projects having the same variable as reference candidates. The HMI development support device 10 displays a list of the reference candidates (S113). The HMI development support device 10 receives selection of the reference HMI project from the list of the reference candidates according to specification of the operation input unit 13 and the like (S114).

The HMI development support device 10 acquires a screen structure and attribute values of the reference HMI project (S12). The HMI development support device 10 temporarily stores the screen structure and the attribute values of the reference HMI project and a screen structure and attribute values of the HMI project being edited (S13).

The HMI development support device 10 compares the attribute values of the reference HMI project with the attribute values of the HMI project being edited (S14).

If there are differences between the attribute values of the reference HMI project and the attribute values of the HMI project being edited (S15: YES), the HMI development support device 10 displays a comparison screen on which the differences are highlighted (S16). Specifically, the HMI development support device 10 highlights the attribute values and the objects corresponding to the differences on the comparison screen.

On the other hand, if there are no differences (S15: NO), the HMI development support device 10 displays a normal comparison screen (S17). Specifically, the HMI development support device 10 display a comparison screen without highlights.

Figure 4:
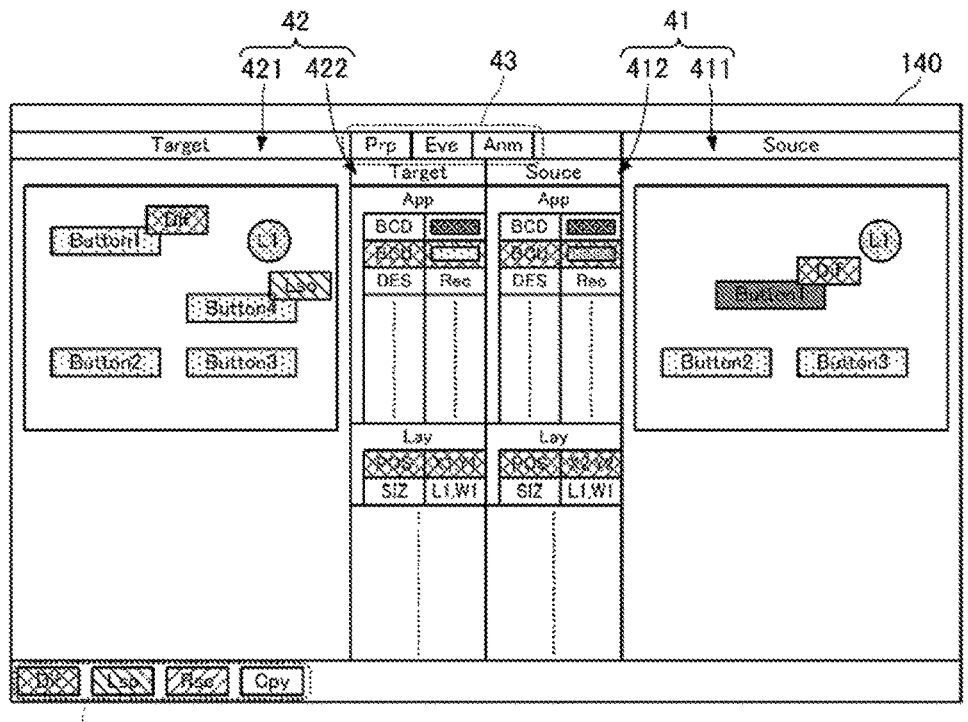
FIG. 4 is a diagram showing one example of a comparison screen when there are differences.
Figure 5:
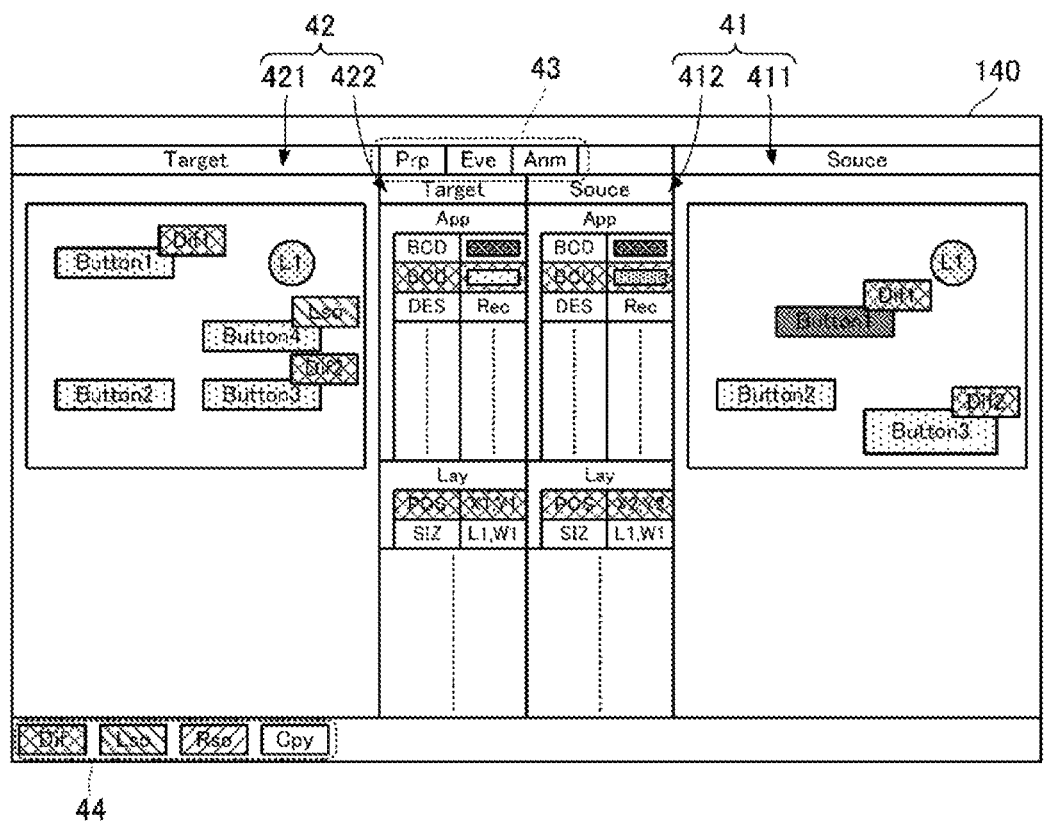
FIG. 5 is a diagram showing one example of the comparison screen when there are differences.

FIG. 4 and FIG. 5 are diagrams showing one example of the comparison screen when there are differences. Difference aspects are different in FIG. 4 and FIG. 5.

As shown in FIG. 4, a comparison screen 140 has an editing target display area 41 and a reference display area 42. The editing target display area 41 and reference display area 42 are displayed in parallel on the comparison screen 140. The editing target display area 41 has an editing target object arrangement 411 and an editing target attribute value list 412. The editing target object arrangement 411 and the editing target attribute value list 412 are displayed in parallel. The reference display area 42 has a reference object arrangement 421 and a reference attribute value list 422. The reference object arrangement 421 and the reference attribute value list 422 are displayed in parallel.

The editing target attribute value list 412 and the reference attribute value list 422 are displayed adjacently. The editing target attribute value list 412 and the reference attribute value list 422 are displayed so that individual attribute values are adjacent. In this way, comparison between individual attribute values of the HMI project being edited and individual attribute values of the reference HMI project is easy.

The editing target object arrangement 411 and the reference object arrangement 421 are displayed to clamp the editing target attribute value list 412 and the reference attribute value list 422. In this way, comparison between object arrangements of the HMI project being edited and object arrangements of the reference HMI project is easy.

Furthermore, as shown in FIG. 4, the differences between objects of the HMI project being edited and objects of the reference HMI project are highlighted on the comparison screen 140. Specifically, as shown in FIG. 4, in the editing target object arrangement 411 and the reference object arrangement 421, tags are displayed on the differences.

The type of the tags, that is, the type of the differences is displayed on a tag reference area 44 of the comparison screen 140. Specifically, "Dif" means that an object in which variables are the same exists in both the HMI project being edited and the reference HMI project but the attribute values are different. "Lso" means that the object does not exist in the HMI project being edited but exists in the reference HMI project. "Rso" means that the object does not exist in the reference HMI project but exists in the HMI project being edited. "Cpy" means that the attribute value or the object itself is copied by the merge processing described later from the reference HMI project to the HMI project being edited.

For example, in the example of FIG. 4, a "Button 1" object is different in the HMI project being edited and the reference HMI project in background color and arrangement position. In this case, in each of the editing target object arrangement 411 and the reference object arrangement 421, a tag of "Dif" is displayed on the "Button 1" object. In this way, a programmer can easily and more reliably recognize that the attribute value of the "Button 1" object is different in the HMI project being edited and the reference HMI project.

In addition, in the example of FIG. 4, a "Button 4" object does not exist in the HMI project being edited but exists in the reference HMI project. In this case, in the reference object arrangement 421, a tag of "Lso" is displayed on the "Button 4" object. In this way, the programmer can easily and more reliably recognize that the "Button 4" object exists in the reference HMI project but does not exist in the HMI project being edited.

Furthermore, on the comparison screen 140, the differences are highlighted for each attribute value in the editing target attribute value list 412 and the reference attribute value list 422. For example, in the example of FIG. 4, as the attribute values of the "Button 1" object, BCU (background color) of App (Appearance) of Prp (property) and POS (arrangement position) of Lay (Layout) of Prp (property) are highlighted. In this way, the programmer can easily and more reliably recognize which attribute value of the "Button 1" object is different in the HMI project being edited and the reference HMI project.

Besides, not only Prp (property), but Eve (event action) and Anm (animation) can also be set as the attribute values of object, and they are highlighted as long as there are differences, and the tags are displayed on the objects of the editing target display area 41 and the reference display area 42. The Prp, Eve, and Anm are selected by an attribute value item switching tag 43 of the comparison screen 140, and thereby the display can be switched.

Accordingly, by having the configuration and processing of the HMI development support device 10, the programmer can easily and more reliably recognize the differences between the HMI project being edited and the reference HMI project. Furthermore, the programmer can easily and more reliably recognize the differences for each attribute value.

FIG. 5 shows a state in which the arrangement and attribute values of a "Button 3" object are further different with respect to the state of FIG. 4. In this case, as shown in FIG. 5, the same tag is displayed on the objects in which variables are the same. For example, a tag of "Dif 1" is displayed on the "Button 1" object, and a tag of "Dif 2" is displayed on the "Button 3" object. In this way, even when there is a plurality of objects having differences in the HMI project being edited and the reference HMI project, a corresponding relationship of each object can be easily recognized.

Figure 6:
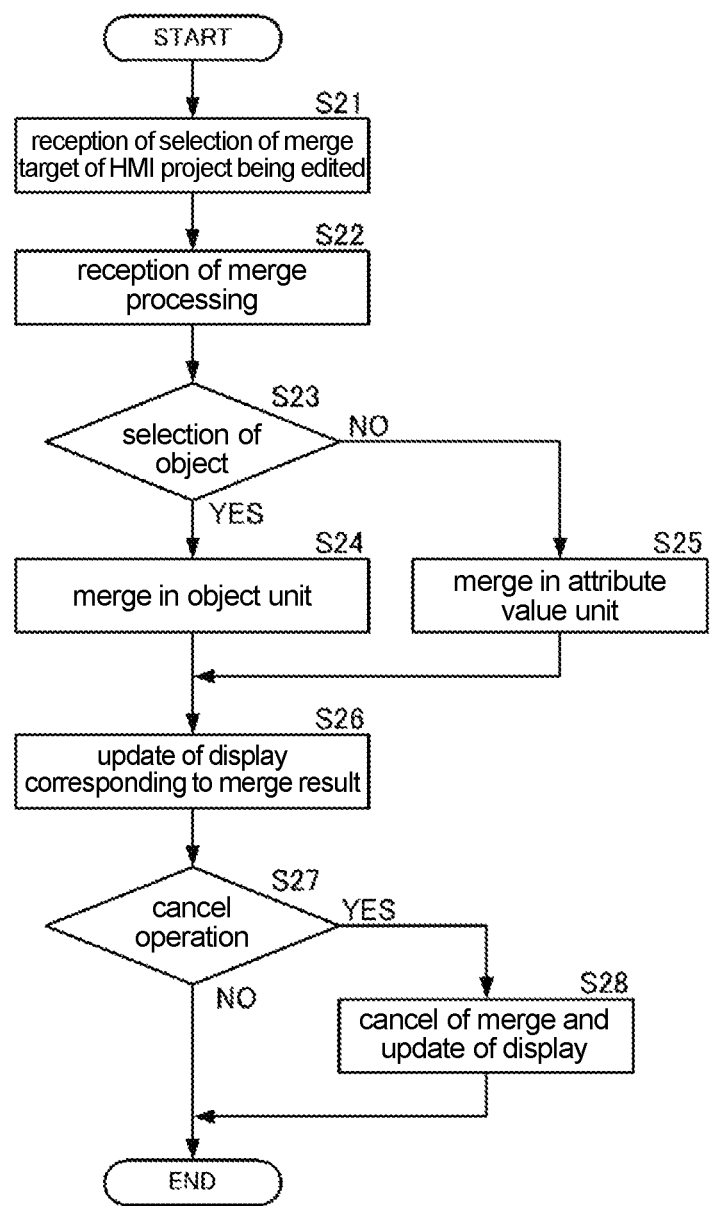
FIG. 6 is a flowchart of merge processing in the HMI development support method of the present invention.

Next, the merge processing is described. FIG. 6 is a flowchart of the merge processing in the HMI development support method of the present invention.

The HMI development support device 10 receives selection of a merge target of the HMI project being edited (S21). The merge target may be selected in object unit or in attribute value unit. The HMI development support device 10 receives merge processing of the selected object and the selected attribute values (S22).

If an object of the editing target object arrangement 411 is selected (S23: YES), the HMI development support device 10 performs merge in object unit (S24). That is, the HMI development support device 10 replaces all attribute values which are differences in the selected object with the attribute values of the objects having the same variables in the reference HMI project. In this way, even when a plurality of attribute values in the object is different, all the different attribute values can be equalized by one operation.

On the other hand, if the attribute values of the editing target attribute value list 412 are selected (S23: NO), the HMI development support device 10 performs merge with the selected attribute values only (S25). That is, the HMI development support device 10 replaces only the selected attribute values that are differences with the attribute values of the objects having the same variables in the reference HMI project. In this way, when a plurality of attribute values in the object is different, it is possible to equalize only the necessary attribute values.

The HMI development support device 10 updates a display of the comparison screen 140 corresponding to a merge result (S26). Accordingly, the programmer can immediately recognize the merge result.

If a cancel operation of merge is received (S27: YES), the HMI development support device 10 cancels the merge and redisplays the HMI project being edited before the merge processing which is stored in the temporary storage unit 15 (S28). Besides, if the cancel processing of merge is not performed (S27: NO), the HMI development support device 10 does not perform the cancel processing.

Figure 7A:
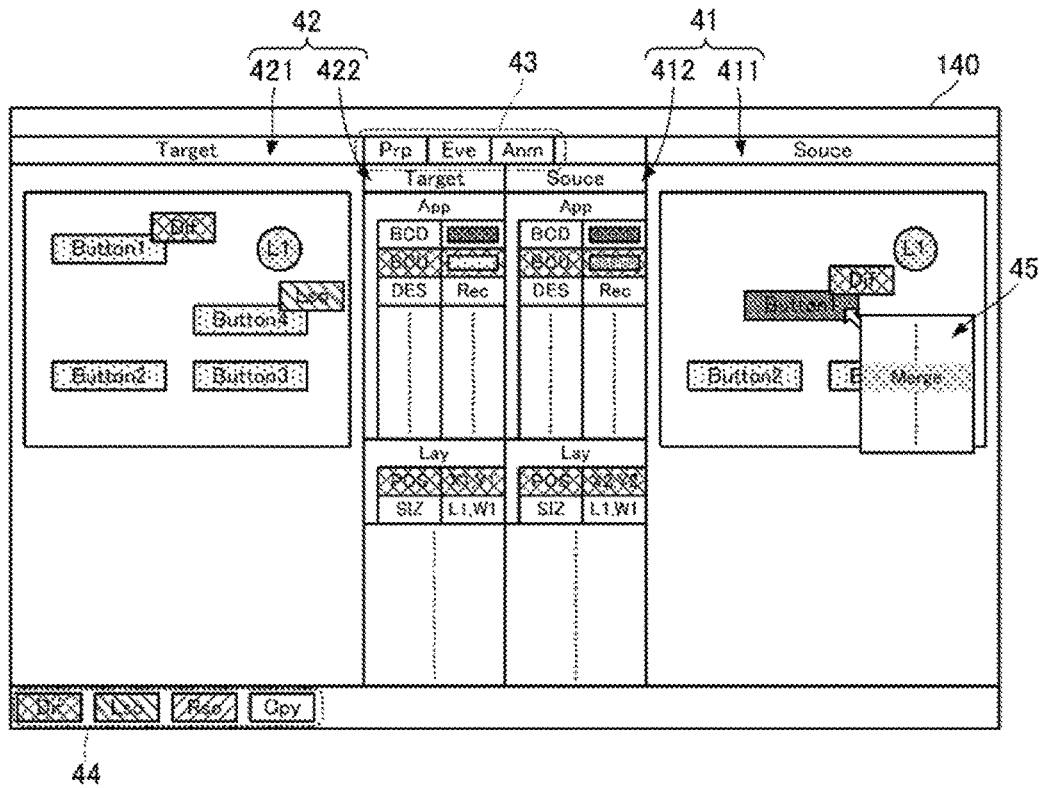
FIG. 7A is a diagram showing a comparison screen during operation of the merge processing in object unit.
Figure 7B:
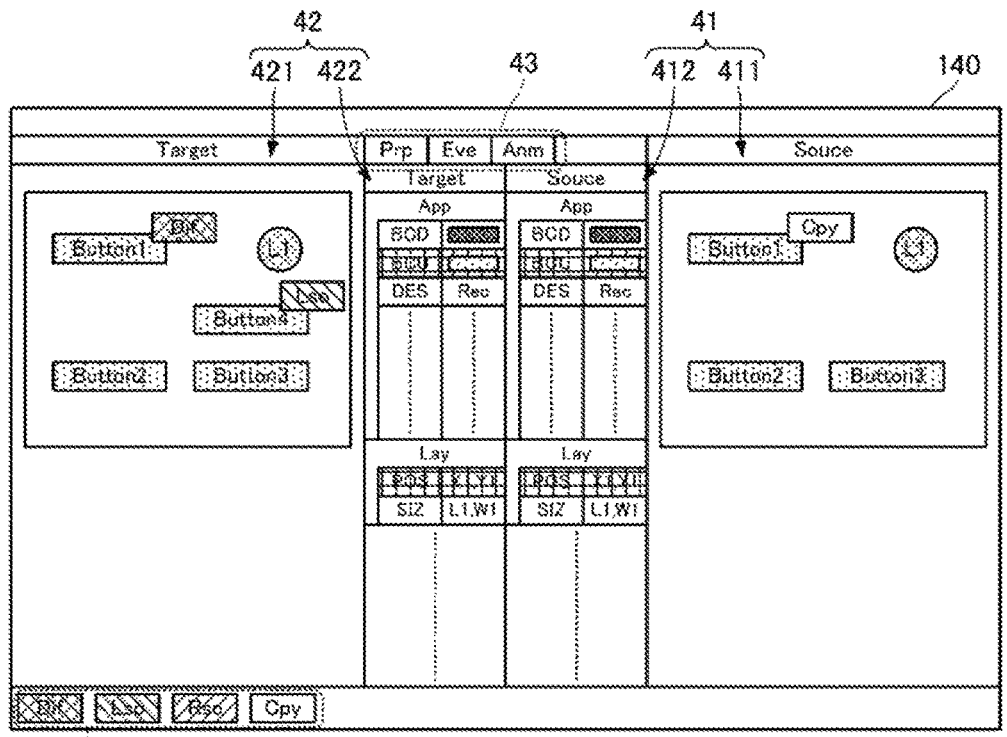
FIG. 7B is a diagram showing a comparison screen after the merge processing.

FIG. 7A is a diagram showing a comparison screen during operation of the merge processing in object unit, and FIG. 7B is a diagram showing a comparison screen after the merge processing.

First, as shown in FIG. 7A, in the editing target object arrangement 411 of the comparison screen 140, when the "Button 1" object is selected and a prescribed operation is performed, the HMI development support device 10 displays a processing selection window 45 near the object.

When "Merge" is selected, the HMI development support device 10 reads out the attribute values of the "Button 1" object of the reference HMI project.

The HMI development support device 10 overwrites the attribute values of the "Button 1" object of the HMI project being edited with the attribute values of the "Button 1" object of the reference HMI project that are read out.

As shown in FIG. 7B, the HMI development support device 10 updates the editing target display area 41 (the editing target object arrangement 411 and the editing target attribute value list 412) corresponding to the overwritten "Button 1" object of the HMI project being edited and the attribute values thereof. That is, in the editing target object arrangement 411, a tag of "Cpy" is displayed on the "Button 1" object. At this time, when the position of the object is moved, the HMI development support device 10 also moves the display position of the object as shown in FIG. 7B.

In addition, in the editing target attribute value list 412, as shown in FIG. 7B, the updated attribute values are subjected to a highlight display that shows the update.

Figure 8A:
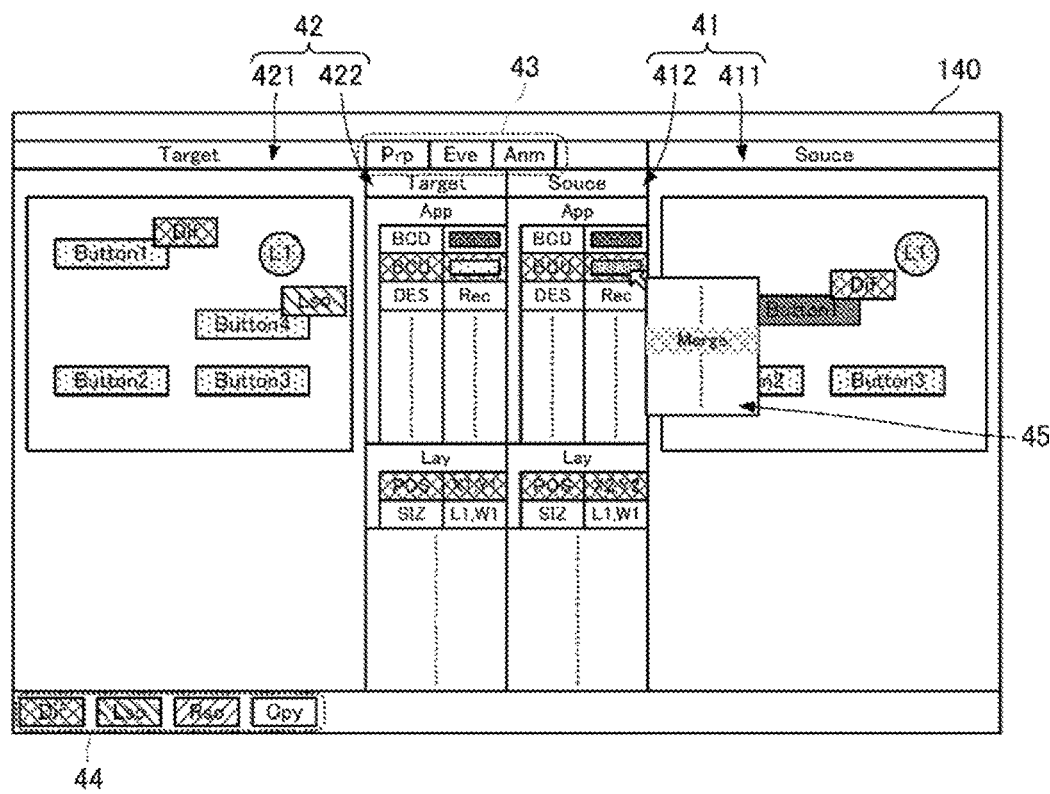
FIG. 8A is a diagram showing a comparison screen during operation of the merge processing in attribute value unit.
Figure 8B:
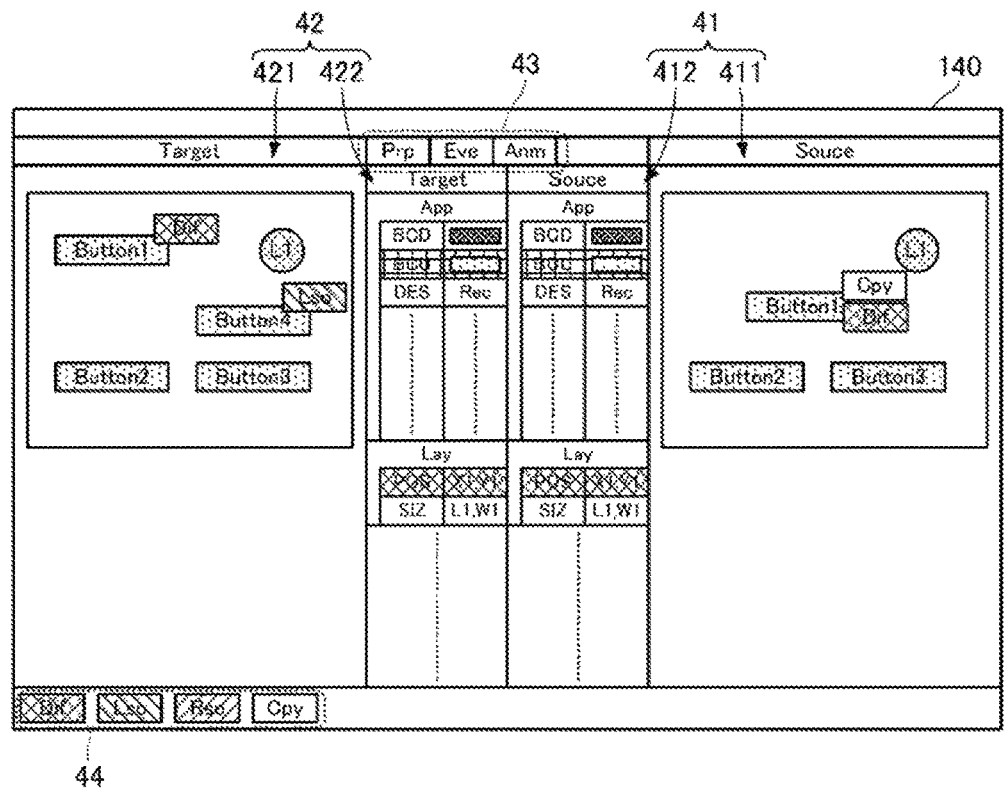
FIG. 8B is a diagram showing a comparison screen after the merge processing.

FIG. 8A is a diagram showing a comparison screen during operation of the merge processing in attribute value unit, and FIG. 8B is a diagram showing a comparison screen after the merge processing.

First, as shown in FIG. 8A, in the editing target attribute value list 412 of the comparison screen 140, when an item "BCU" is selected and a prescribed operation is performed, the HMI development support device 10 displays the processing selection window 45 near a column of the item "BCU".

When "Merge" is selected, the HMI development support device 10 reads out the attribute values of the item "BCU" of the "Button 1" object of the reference HMI project.

The HMI development support device 10 overwrites the attribute values of the item "BCU" of the "Button 1" object of the HMI project being edited with the attribute values of the item "BCU" of the "Button 1" object of the reference HMI project that are read out.

As shown in FIG. 8B, the HMI development support device 10 updates the editing target display area 41 (the editing target object arrangement 411 and the editing target attribute value list 412) corresponding to the overwritten item "BCU" of the "Button 1" object of the HMI project being edited and the attribute values thereof. That is, the overwritten attribute values and the attribute values that are not overwritten exist in the editing target object arrangement 411, and thus the tags of "Cpy" and "Dif" are displayed on the "Button 1" object. At this time, when the position of an object is moved, the HMI development support device 10 also moves the display position of the object.

In addition, in the editing target attribute value list 412, as shown in FIG. 8B, the updated attribute values are subjected to a highlight display that shows the update.

Accordingly, by having the configuration and processing of the HMI development support device 10, the programmer can easily perform merge for the HMI project being edited in object unit or in attribute value unit. Furthermore, the programmer can immediately recognize the merge result.

What is claimed is:

1. A human machine interface (HMI) development support device, comprising:
   a processor configured to perform editing of a HMI project that is configured by a plurality of objects;
   a display, coupled to the processor, which displays an editing screen of the HMI project; and
   a memory, which temporarily stores the HMI project being edited,
   wherein the processor forms a comparison screen for highlighting differences between a reference HMI project and the HMI project being edited, and displays the comparison screen on the display,
   wherein the comparison screen is a screen that highlights different attribute values in objects of the reference HMI project and objects of the HMI project being edited,
   wherein the processor reflects the attribute values of the objects of the reference HMI project on the attribute values of the objects of the HMI project being edited,
   wherein the attribute values of the objects comprise properties, event actions, or animations of the objects,
   wherein the processor reflects selected attribute values when a plurality' of attribute values is different,
   wherein on receiving cancel of processing for reflecting the attribute values, the processor returns to the HMI project being edited that is read out from the memory,
   wherein the processor controls the display to display, in the comparison screen, an arrangement of the objects of the reference HMI project and the attribute values of the objects of the reference HMI project in parallel, an arrangement of the objects of the HMI project being edited and the attribute values of the objects of the HMI project being edited in parallel, and the attribute values of the objects of the reference HMI project and the attribute values of the objects of the HMI project being edited in adjacent,
   wherein the processor controls the display to display, in the comparison screen, the arrangement of the objects of the reference HMI project and the arrangement of the objects of the HMI project being edited to clamp the attribute values of the objects of the reference HMI project and the attribute values of the objects of the HMI project being edited.

2. The HMI development support device according to claim 1,
   wherein the processor forms the comparison screen for highlighting the objects of the reference HMI project and the objects of the HMI project being edited in which attribute values are different from each other and variables are common.

3. A human machine interface (HMI) development support method, comprising:
   a HMI editing process for performing editing of a HMI project which is configured by a plurality of objects, and
   a display process for displaying an editing screen of the HMI project;
   wherein the HMI editing process comprises
   a comparison processing process for forming a comparison screen between a reference HMI project and a HMI project being edited and displaying the comparison screen on a display;
   wherein the comparison processing process forms the comparison screen for highlighting different attribute values as differences between the reference HMI project and the HMI project being edited, wherein the comparison processing process comprises a merge processing process for reflecting the attribute values of the objects of the reference HMI project on the attribute values of the objects of the HMI project being edited, wherein the attribute values of the objects comprise properties, event actions, or animations of the objects, wherein the merge processing process reflects selected attribute values when a plurality of attribute values is different, wherein on receiving cancel of processing for reflecting the attribute values, the HMI editing process returns to the HMI project being edited that is read out from a memory which has temporarily stored the HMI project being edited, wherein the display process displays, in the comparison screen, an arrangement of the objects of the reference HMI project and the attribute values of the objects of the reference HMI project in parallel, an arrangement of the objects of the HMI project being edited and the attribute values of the objects of the HMI project being edited in parallel, and the attribute values of the objects of the reference HMI project and the attribute values of the objects of the HMI project being edited in adjacent, wherein the display process displays, in the comparison screen, the arrangement of the objects of the reference HMI project and the arrangement of the objects of the HMI project being edited to clamp the attribute values of the objects of the reference HMI project and the attribute values of the objects of the HMI project being edited.

4. A non-transitory computer-readable recording medium comprising a human machine interface (HMI) development support program, the HMI development support program causes a computer to execute:

HMI editing processing for performing editing of a HMI project which is configured by a plurality of objects, and display processing for displaying an editing screen of the HMI project;

wherein the HMI editing processing comprises comparison processing for forming a comparison screen between a reference HMI project and a HMI project being edited and displaying the comparison screen on a display;

in the comparison processing, the computer is caused to execute processing for forming the comparison screen for highlighting different attribute values as differences between the reference HMI project and the HMI project being edited, the computer is caused to reflect the attribute values of the objects of the reference HMI project on the attribute values of the objects of the HMI project being edited, wherein the attribute values of the objects comprise properties, event actions, or animations of the objects, the computer is caused to reflect selected attribute values when a plurality of attribute values is different, wherein on receiving cancel of processing for reflecting the attribute values, HMI editing processing returns to the HMI project being edited that is read out from a memory which has temporarily stored the HMI project being edited, in the display processing, the computer is caused to execute processing for displaying, in the comparison screen, an arrangement of the objects of the reference HMI project and the attribute values of the objects of the reference HMI project in parallel, an arrangement of the objects of the HMI project being edited and the attribute values of the objects of the HMI project being edited in parallel, and the attribute values of the objects of the reference HMI project and the attribute values of the objects of the HMI project being edited in adjacent, the computer is caused to execute processing for displaying, in the comparison screen, the arrangement of the objects of the reference HMI project and the arrangement of the objects of the HMI project being edited to clamp the attribute values of the objects of the reference HMI project and the attribute values of the objects of the HMI project being edited.

* * * * *